United States Patent [19]

Salvadori

[11] Patent Number: 4,676,879

[45] Date of Patent: Jun. 30, 1987

[54] METHOD FOR THE PRODUCTION OF AN ALUMINUM FOIL FOR ELECTROLYTIC CAPACITORS, AND ELECTROLYTIC CAPACITORS THUS PRODUCED

[75] Inventor: Luigi Salvadori, Milan, Italy

[73] Assignee: Becromal S.p.A., Milan, Italy

[21] Appl. No.: 831,442

[22] Filed: Feb. 20, 1986

[30] Foreign Application Priority Data

Apr. 12, 1985 [EP] European Pat. Off. ........ 85104473.5
Apr. 17, 1985 [EP] European Pat. Off. ........ 85104668.0

[51] Int. Cl.$^4$ .............................................. C25F 3/04
[52] U.S. Cl. ............................................. 204/129.75
[58] Field of Search ............ 204/129.75, 129.8, 129.43

[56] References Cited

U.S. PATENT DOCUMENTS 3,520,788  7/1970  Paehr .............................. 204/129.75

Primary Examiner—T. M. Tufariello
Attorney, Agent, or Firm—Wenderoth, Lind & Ponack

[57] ABSTRACT

Method for producing an aluminum foil for use in electrolytic capacitors, wherein an aluminum foil is subjected to treatment in a satination bath prior to conventional anodic etching. The satination bath gives the foil a more uniform surface condition, so that the subsequent etching occurs in a more uniform manner.

14 Claims, 4 Drawing Figures

METHOD FOR THE PRODUCTION OF AN ALUMINUM FOIL FOR ELECTROLYTIC CAPACITORS, AND ELECTROLYTIC CAPACITORS THUS PRODUCED

BACKGROUND OF THE INVENTION

The present invention relates to a method for the production of an aluminum foil for electrolytic capacitors by anodic etching in a bath containing an electrolyte and a counterelectrode with a direct current superimposed by current pulses, or a pulsating direct current, in which the voltage pulses are preferably of such polarity and size that they momentarily and periodically interrupt the etching, followed by subsequent activation.

A method of this type is known from DE-OS No. 15 64 486 and corresponding U.S. Pat. No. 3,520,788. This prior etching method obtains satisfactory results in static etching baths. If, however, continuous etching is conducted, surprisingly the etching attack is non-uniform because of the dynamic effect of the continous bath. The natural surface of the aluminum foil is obviously more or less resistant to the etching attack, and the etching conditions are poorly defined in the immersion area of the bath, especially as a result of the foam produces by the etching.

SUMMARY OF THE INVENTION

The object of the present invention is to improve on a method of this type so that it leads to the greatest possible and more uniform roughening, i.e. high, uniform capacitance over the foil surface, with good mechanical stability of the foil both in static and in continous etching baths.

This object is attained according to the invention by subjecting the foil to immersion in a satination bath before the etching. In this manner, especially those difficulties arising in continous etching baths are surprisingly avoided or are greatly diminished. With the satination bath, the foil is brought to a much more uniform surface condition, so that the subsequent etching attack occurs in a remarkably more uniform manner and the desired electric and mechanical values can be attained without difficulty.

DETAILED DESCRIPTION OF THE INVENTION

Figure 2:
FIGS. 1 and 2 represent cross-sections illustrating the differences in etching of an aluminium foil as between the prior art method and the method of the present invention, respectively.

The present invention thus provides, in a method for the production of aluminum foil suitable for use in an electrolytic capacitor, which comprises subjecting an aluminum foil to anodic etching in an etching bath containing an electrolyte and a counterelectrode by means of direct current superimposed by current pulses, or by means of pulsating direct current, the improvement which comprises immersing said aluminum foil in a satination bath to improve the uniformity of surface properties of said foil before said anodic etching.

The satination bath contains an aqueous solution of an electrolyte, for example, a hydrogen halide acid or a salt thereof, preferably hydrogen chloride or a salt thereof is used.

It is also preferable that the satination bath has a low CB value, for example, from about 2 to about 5 $Cb/cm^2$.

Another feature of the invention reside in that the foil is subjected in the satination bath to a satination current with a frequency between about 20 and about 400 Hz, and a duty cycle of more than 40%, preferably about 50%. Tests have shown that an especially improved uniformity of the foil is obtained in this manner, as preparation for the etching.

In order to obtain especially good results, the foil may be satinated at a temperature of about 90° C. The anodic etching bath and conditions can be those which are conventional, for example as disclosed in U.S. Pat. No. 3,520,788.

The present invention also relates to electrolytic capacitors which have aluminum foils and which are produced according to the method of the invention.

In the following non-limiting examples, the effect of the satination before anodic etching according to the invention is explained. As apparent from these examples, this method improves the uniformity of the surface properties and increases the capacity of the aluminum foil.

EXAMPLE 1

A. Effect with static etching without satination bath:
  Electrolyte: aqueous solution containing 10% by weight of sodium chloride.
  Etching time: 160 seconds.
  Direct current: 0,6 $A/cm^2$.
  Pulse shape: rectangular.
  Frequency: 40 Hz.
  Duty cycle: 0,9.
  Inverse current: 0,18 $A/cm^2$.
  Etching time: 160 seconds = 90 $Cb/cm^2$.
  Specific capacitance at 20 V forming voltage: 35 $\mu FD/cm^2$.
B. Effect with static etching after a satination bath:
  Satination bath: aqueous solution containing 10% by weight of chloride.
  Satination current strength 3 $Cb/cm^2$ in 120 seconds.
  Use of a satination current having wave shape and a duty cycle of 0,5.
  Etching bath: as in A above.
  Specific capacitance at 20 V forming voltage: 42 $\mu FD/cm^2$.
  This corresponds to a capacitance increase of 20%.

EXAMPLE 2

A. Effect with dynamic etching without satination bath:
  Etching corresponding to the embodiment described in U.S. Pat. No. 3,520,788 with a current strength of 72 $Cb/cm^2$.
  Specific capacitance at 20 V forming voltage: 34 $\mu FD/cm^2$.
B. Effect with dynamic etching after a satination bath:
  Combination of etching according to the embodiment of U.S. Pat. No. 3,520,788 with a current strength of 72 $Cb/cm^2$ after 5 $Cb/cm^2$ satination.
  Specific capacitance at 20 V forming voltage: 53 $\mu FD/cm^2$.
  This corresponds to a capacitance increase of almost 56%.

Figure 2A:
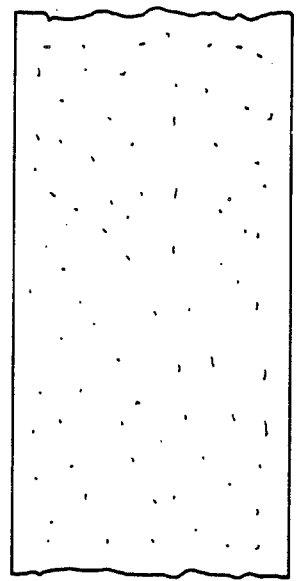
FIGS. 1a and 2a represent top plan views illustrating the surfaces of the aluminum foils of FIGS. 1 and 2, respectively.
Figure 1:
Figure 1A:
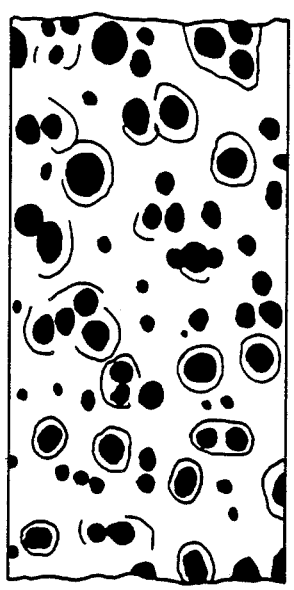

The comparison of the etching attack is shown in the sectional and surface views in the drawings, wherein FIG. 1 shows the results of Example 2A and FIG. 2 shows the results of Example 2B, and FIGS. 1a and 2a are diagrams of the respective surface views of the aluminum foils.

The conditions of the main etching were the same in both examples, in order to indicate the effect of the application of the satination stage.

I claim:

1. In a method for the production of an aluminum foil suitable for use in an electrolytic capacitor, which comprises subjecting an aluminum foil to anodic etching in an etching bath containing an electrolyte and a counter-electrode by means of direct current superimposed by current pulses, the improvement which comprises immersing said aluminum foil in a satination bath to improve the uniformity of surface properties of said foil before said anodic etching, wherein said satination bath contains a hydrogen halide acid or a salt thereof and has a Cb value of from 2 to about 5 Cb/cm$^2$.

2. A method according to claim 1, wherein a satination current of wave shaping having a frequency of from about 20 to 400 Hz and a duty cycle of more than 40% is applied to said satination bath.

3. A method according to claim 2, wherein said duty cycle is about 50%.

4. A method according to claim 1, wherein said satination bath is maintained at a temperature of about 90° C.

5. A method according to claim 1, wherein said satination bath contans hydrogen chloride or a salt thereof.

6. A method according to claim 1, wherein voltage pulses are applied to said etching bath to momentarily and periodically interrupt said anodic etching.

7. An electrolytic capacitor which has an aluminum foil produced by the method of claim 1.

8. In a method for the production of an aluminum foil suitable for use in an electrolytic capacitor, which comprises subjecting an aluminum foil to anodic etching in an etching bath containing an electrolyte and a counter-electrode by means of pulsating direct current, the improvement which comprises immersing said aluminum foil in a satination bath to improve the uniformity of surface properties of said foil before said anodic etching, wherein said satination bath contains a hydrogen halide acid or a salt thereof and has a Cb value of from 2 to about 5 Cb/cm$^2$.

9. A method according to claim 8, wherein a satination current of wave shape having a frequency of from about 20 to 400 Hz and a duty cycle of more than 40% is applied to said satination bath.

10. A method according to claim 9, wherein said duty cycle is about 50%.

11. A method according to claim 8, wherein said satination bath is maintained at a temperature of about 90° C.

12. A method according to claim 8, wherein said satination bath contans hydrogen chloride or a salt thereof.

13. A method according to claim 8, wherein voltage pulses are applied to said etching bath to momentarily and periodically interrupt said anodic etching.

14. An electrolytic capacitor which has an aluminum foil produced by the method of claim 8.

* * * * *